(12) United States Patent
Lu (10) Patent No.: US 7,225,222 B1
(45) Date of Patent: May 29, 2007

(54) METHODS, DATA STRUCTURES, AND SYSTEMS TO ACCESS DATA IN CROSS-LANGUAGES FROM CROSS-COMPUTING ENVIRONMENTS

(75) Inventor: Yanfeng Lu, Orem, UT (US)

(73) Assignee: Novell, Inc., Provo, UT (US)

( * ) Notice: Subject to any disclaimer, the term of this patent is extended or adjusted under 35 U.S.C. 154(b) by 792 days.

(21) Appl. No.: 10/051,545

(22) Filed: Jan. 18, 2002

(51) Int. Cl.
*G06F 15/16* (2006.01)
*G06F 15/00* (2006.01)
*G06F 3/00* (2006.01)

(52) U.S. Cl. .................. 709/203; 709/245; 715/536; 719/328

(58) Field of Classification Search .................. None
See application file for complete search history.

(56) References Cited

U.S. PATENT DOCUMENTS

| 5,434,776 | A | * | 7/1995 | Jain ............................. 704/8 |
| 6,021,202 | A | | 2/2000 | Anderson et al. ............. 380/25 |
| 6,025,836 | A | | 2/2000 | McBride ..................... 345/326 |
| 6,182,148 | B1 | | 1/2001 | Tout ............................ 709/245 |
| 6,209,095 | B1 | | 3/2001 | Anderson et al. ........... 713/176 |
| 6,275,978 | B1 | | 8/2001 | Bell .............................. 717/2 |
| 6,314,469 | B1 | | 11/2001 | Tan et al. ................... 709/245 |
| 6,430,624 | B1 | * | 8/2002 | Jamtgaard et al. .......... 709/246 |
| 6,609,246 | B1 | * | 8/2003 | Guhr et al. ................. 717/103 |
| 6,623,529 | B1 | | 9/2003 | Lakritz ....................... 715/536 |
| 6,760,719 | B1 | * | 7/2004 | Hanson et al. ................. 707/3 |
| 6,964,014 | B1 | * | 11/2005 | Parish ........................ 715/513 |
| 2002/0002452 | A1 | * | 1/2002 | Christy et al. ................. 704/3 |
| 2002/0062396 | A1 | * | 5/2002 | Kakei et al. ................ 709/246 |
| 2005/0027709 | A1 | * | 2/2005 | White et al. ................. 707/10 |

* cited by examiner

*Primary Examiner*—Wen-Tai Lin
(74) *Attorney, Agent, or Firm*—Schwegman Lundberg Woessner & Kluth P.A.

(57) ABSTRACT

Methods, data structures, and systems are provided to access data in cross-languages from cross-computing environments. A first request from a first computing environment is received to access the data in a first language. Concurrently, a second request from a second computing environment is received to access the data in the first language. A single message file used to service the requests is used to provide the data in the first language to both the requests within both computing environments. In another embodiment, the second request is received to access the data in a second language, wherein a second message file is used to provide the data in the second language to satisfy the second request simultaneously with the first request.

17 Claims, 8 Drawing Sheets

METHODS, DATA STRUCTURES, AND SYSTEMS TO ACCESS DATA IN CROSS-LANGUAGES FROM CROSS-COMPUTING ENVIRONMENTS

COPYRIGHT NOTICE/PERMISSION

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in any drawings hereto: Copyright© 2002, Novell, Inc., All Rights Reserved.

FIELD OF THE INVENTION

The present invention relates to accessing data, and in particular to methods, data structures, and systems used to provide access to data in cross-languages from cross-computing environments.

BACKGROUND OF THE INVENTION

With the rapid developments occurring within the computer software industry/data content industry, the competition among companies is becoming increasingly more intense. The capabilities, associated with the software product/data content, play a paramount role in the success of the software product/data content within the industry. And, the capability of having the software product/data content be compatible within cross-computing environments in cross-language is a critical feature for any software product/data content to achieve in today's heterogeneous computing environment and unified world. This is especially true with the omnipresence of the Internet, where the access to software products/data content is pervasive.

The ability to operate on a cross-computing environment permits a software product to be delivered onto disparate and heterogeneous computing environments where multiple computing devices with disparate platforms (e.g., operating systems) work seamlessly on a single version of the software product. Moreover, the ability to deliver data content in cross-languages provides an international market for the data content.

Accordingly, a single software product operating with singular data content can capture and reach a prodigious market within the industry and can determine the difference between success or failure. Further, many software products are sold internationally. Readying a product for release in another country typically requires modifying the user interface associated with the software product and producing duplicated data content, which is used or provided by the software product, since typically a software product is designed for use in a country in which one particular host language is predominately used and often that host language will be unsuitable for use in another country in which another language is predominately used.

The process of modifying a software product for use in different countries is referred to as "localization." Since software products are frequently released in many different countries, the modifications to the software product, which are necessary to localize the product for the various countries, can be expensive. The process of facilitating or streamlining localization is referred to as "internationalization." A major problem with internationalization is allowing the data content to be displayed to the user separate from the source code so that it could be easily translated into the appropriate language with certain locale, dialect or profession. Typically, this means that the software product cannot use hard coded messages or static data tables and must instead read in a set of data messages at runtime, based on the locale setting. Good internationalization techniques will facilitate localization greatly.

Unfortunately existing internationalization software development tools and packages are not capable of efficient operation on cross-computing environments making the production of an international software product even more difficult to achieve, since many international users, like national users, have disparate computing environments.

For each computing environment to achieve an international software product, a particular version of message files describing the content data from a host language to a desired language is required. Additionally, the use of a particular set of internationalization software development tools and packages is required to process and handle the message files. Although the existing techniques of providing multiple versions of message files, multiple versions of tools, and multiple versions of packages can provide software products/data content, which are internationalized, the prevailing techniques have some obvious shortcomings associated with software development expense, software development support, software development maintenance, and processing capacity.

With respect to software development shortcomings, separate message files have to be created, synchronized, and subsequently maintained for all disparate computing environments supported and languages supported. Furthermore, existing techniques require software developers to use different message tools and packages to process the message files as messages are processed for each of the different computing environments. For example, different message file loading and message retrieving routines from packages (e.g., such as what is provided by the Internationalization (I18N) and Localization (L10N) Committee for the World-Wide Web Consortium (W3C)) are required to effectively use the message files in many software products.

Additionally with respect to the processing capacity problems, the existing internationalization techniques don't provide a convenient way to handle multiple message files concurrently. This capacity will be essential to an Internet server, as the Internet is getting increasingly internationalized. In the near future we will have more and more Internet servers servicing web browsers worldwide. Without the concurrent accessibility of multiple message files in different languages, it will be very difficult to develop an international Internet server.

As is apparent, there exists a need for providing a single message file to facilitate the translation of content data from a single host language to a desired language, irrespective of the local computing environment in which the desired language is provided. Further, there exists a need for providing a single set of software development tools and packages, such that internationalization and localization are achieved cross-computing environments. And finally, there exists a need for providing a convenient way to handle multiple message files concurrently.

SUMMARY OF THE INVENTION

In various embodiments of the present invention, a single message file for a single language is described. The single message file is operable to be accessed from multiple cross-computing environments. Furthermore, in other embodiments multiple messages files in multiple languages are described, wherein the multiple message files are concurrently provided in multiple cross-computing environments.

More specifically and in one embodiment of the present invention, a method of providing concurrent access to data in cross-computing environments is presented. A first request for the data is received from a first computing environment, and a second request for the data is received from a second computing environment. The second computing environment is different from the first computing environment. Next, a single message file is identified to service the requests and access is concurrently provided to the single message file as directed by the first request from the first computing environment and the second request from the second computing environment.

In another embodiment of the present invention, a method of providing access to data in cross-languages and on cross-computing environments is described. A first request for the data is received, wherein the first request requires the data to be provided in a first language on a first computing environment. Also, a second request is received for the data, wherein the second request requires the data to be provided in a second language on a second computing environment. A first message file for the data in the first language is identified and a second message file for the data in the second language is also identified. The first message file and the second message file are concurrently provided to service the first request and the second request in the first computing environment and the second computing environment.

In still another embodiment of the present invention, a system to provide access to data in cross-languages and on cross-computing environments is presented. The system includes a first request for the data from a first computing environment, a second request for the data from a second computing environment, a first message file, a second message file, a set of language manager executable instructions. The set of language manager executable instructions is operable to identify the first message file and load a first data structure representing the data in a first language. Moreover, the set of language manager executable instructions is operable to identify the second message file and load a second data structure representing the data in a second language.

In yet another embodiment of the present invention, a cross-computing environment message file is provided. The message file includes a message identifier associated with language data used to represent data in a requested language. Furthermore, the message file includes tagging data operable to identify instructions associated with providing the data in the requested language to a first computing environment and to a second computing environment, wherein the first computing environment is different from the second computing environment.

Still other aspects of the present invention will become apparent to those skilled in the art from the following description of various embodiments. As will be realized the invention is capable of other embodiments, all without departing from the present invention. Accordingly, the drawings and descriptions are illustrative in nature and not intended to be restrictive.

DETAILED DESCRIPTION OF THE INVENTION

In the following description, reference is made to the accompanying drawings that form a part hereof, and in which is shown by way of illustration specific embodiments in which the invention may be practiced. These embodiments are described in sufficient detail to enable one of ordinary skill in the art to practice the invention, and it is to be understood that other embodiments may be utilized and that structural, logical, optical, and electrical changes may be made without departing from the scope of the present invention. The following description is, therefore, not to be taken in a limited sense, and the scope of the present invention is defined by the appended claims.

Software for the system is stored on one or more computer readable media. In one embodiment the software is stored on secondary storage, such as a disk drive, and loaded into main memory and cache of the computer as needed. The software is written in the form of executable instructions that generally provide a single function or subsets of related functions. However, in various embodiments, the software comprises a single module or many modules, and there is no requirement that functions be grouped together. Hardware and/or firmware are used to implement the invention in further embodiments. The software may implement the functions, or simply facilitate the performance of the function by a human by providing menu driven interfaces, or other means of providing information to the system for data storage.

As used herein "file" refers to data logically associated and accessible by executable instructions on a computer readable medium with a file identifier such as, and by way of example only, with a file name in a file system. The data within the file need not be stored within a computer readable medium contiguously. Moreover, the data within the file can reside on multiple computer readable media. The media can be volatile memory, such as a cache or random access memory (RAM), or the media can be non volatile memory such as a CD-ROM, a diskette, a disk drive, a magnetic tape, a memory card, a memory stick, and the like.

Furthermore, as used herein the phrase "cross-computing environments" refers to networked computing devices and computing environments, wherein the computing the devices, environments or the platforms (e.g., operating systems) of the computing devices are partially disparate from one another. The network interface of the computing devices can be indirect, such as with Internet interfaces, or the interfaces can be direct, such as with a local area network (LAN) interfaces, wide area network (WAN) interfaces, and any other network interfaces. Moreover, the connections of the computing devices can be by Radio Frequency (RF), satellite, infrared (IR), any other wireless connection, or any other hardwired connection.

Additionally, as used herein a "consumer" is a module residing on a consumer-computing device, which requests access to data in a desired language. The consumer-computing device participates in the cross-computing environment of the present invention. Likewise, as used herein a "service provider" is a module residing on a server-computing device, which services requests to access the data in the desired language. In some embodiments the consumer and service provider reside on the same computing device and in other embodiments the consumer and the service provider reside on separate computing devices.

Furthermore in one embodiment, the present invention is implemented using extensible markup language (XML) and subsets of XML including XML localization interchange file format (XLIFF). As one of ordinary skill in the art will appreciate, the XML and XLIFF are described according to Document Type Definitions (DTDs), wherein the DTDs are used to parse and validate the data provided in XML or XLIFF. Moreover, in some embodiments the data provided in XML or XLIFF is rendered, translated, and loaded to a memory, such as a cache or RAM, and in other embodiments the data provided in XML or XLIFF is rendered and loaded to a data store, such as a flexible and adaptable information manager (FLAIM) database. Furthermore in other embodiments, the present invention includes at least one computing environment having a Netware operating system environment distributed by Novell, Inc. of Provo, Utah. Of course any programming language, data markup language file format, rendering technique, or operating system can be used without departing from the teachings of the present invention.

Figure 1:
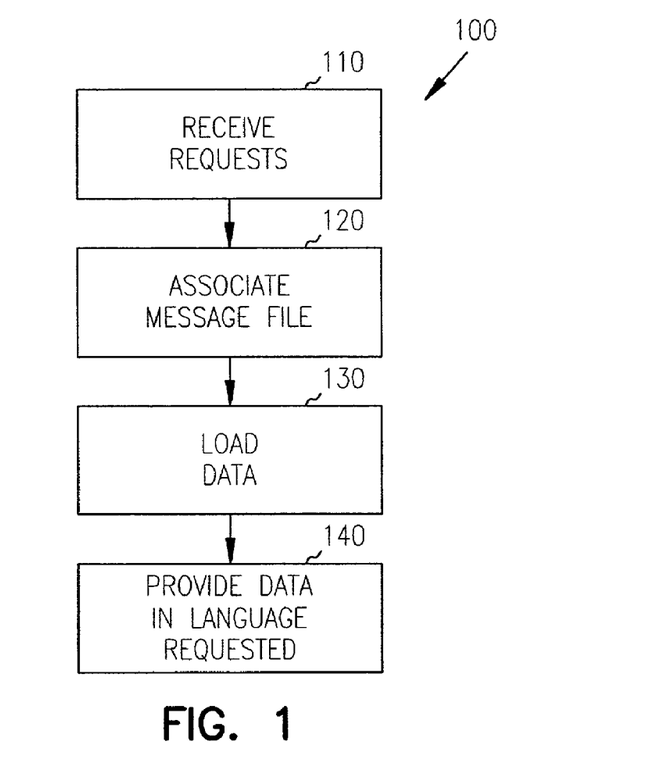
FIG. 1 is a flowchart representing a method of providing access to data upon request, according to the teachings of the present invention.

FIG. 1 illustrates a flowchart representing one method 100 for providing access to data upon request, according to the teachings of the present invention. Initially, a consumer makes a request for access to data from a service provider. In one embodiment, the consumer makes the request from within a browser using an Internet connection to acquire a network interface to the service provider.

Upon receiving the request, the service provider determines a language required to service the request from the consumer. In some embodiments, the determination of the language is explicitly supplied in the request from the consumer, such as by selecting a link within the browser that identifies the language. In other embodiments, the service provider automatically determines the language by using a standard "codepage" operation that provides the language currently being used by the consumer within the consumer's browser. Of course as will be appreciated by one of ordinary skill in the art, a variety of other techniques can be used to manually or automatically determine the language that is associated with a consumer's request, all such techniques are intended to fall within the broad scope of the present invention.

Once the language associated with the request from the consumer is determined, a single message file associated with the desired data is associated with the request in step 120. The single message file is not dependent upon the consumer's computing environment, rather, any request from any consumer having any computing environment that desires access to data in the language is associated with the same single message file.

Of course as one of ordinary skill in the art will readily recognize, the same message file means that the message file includes the same DTD and data tagging scheme, since the actual values within the message file that are associated with the tags can vary by requests received from consumers, and are dynamically populated with the appropriate values upon receiving the requests. For example, a consumer activating a link on a service provider's website generates a request which is determined to be in a particular language, then message data associated with the link, which is provided by the service provider, is identified as a number of values associated with each tag, defined in the single message file, and the values are populated into the message file. Moreover, some values, included with consistent and identical tags within the message file, are resolved such as consumer identification, time of access, and the like.

In this way, the request can generate different values defined in the message file, but the message file itself remains structurally the same, since the DTD and tagging scheme associated with the message file remain consistent. Therefore, each request desiring access to data in a language will have the same DTD and data tagging scheme for the single message file associated with the request. In this way, a single message file is maintained, supported, rendered, and developed for each language and multiple message files are avoided for disparate computing environments.

In one embodiment the single message file is represented in XLIFF and includes standardized tags representing meta information, any software program associated with the request, message file versioning information, data encoding information, modification log information, specific message data associated with the request, message identification numbers associated with each specific message data entry, parameter information associated with the message data or any software program, comment information, and property or attribute information. The tags and the structure of the single message file remain consistent for all desired languages.

In step 130, the single message file is parsed or rendered into a memory or a data store by the service provider. In one embodiment, the tags represented in XLIFF are used by any XML parser set of executable instructions, which is widely known and available to one of ordinary skill in the art. More specifically and in one embodiment, the XML parser is provided within a Novell XML Integration Services (XIS) package, distributed by Novell, Inc. of Provo, Utah. The tags help identify and load structural elements and values included within the single message file. The identified and loaded values are stored in a memory associated with the service provider's computing environment. The loaded message file is represented as a message table that is used by the service provider to load message data associated with individual messages, which were included within the message file, into the language desired by the request, as the request seeks to access the data provided by the service provider.

If the message file is loaded to memory and represented as a message table then the message data included within the originally provided single message file is acquired by indexing the table using the message identification numbers. Also, each message data is loaded into the message table in the table location identified by the appropriate message identification number. In this way, as message data is provided, in step 140, to the consumer, the service provider identifies a message identification number associated with the delivered message data and indexes into the loaded message table on that identification number. The service provider then retrieves the message data in the language, wherein each message data represents at least a portion of the data provided by the service provider that the consumer desires access to in the language.

In still other embodiments, the message file is loaded into a data store, and in some of these embodiments the data store is a database. The database can be a flat file database, a relational database, or an object-oriented database. In one embodiment the data store is a FLAIM database wherein the tags associated with the single message file are loaded to fields of the FLAIM database and one or more fields are grouped in higher level data abstractions as records associated with the FLAIM database. The records can be organized in to still higher-level data abstractions as containers and indexes. The abstractions associated with the FLAIM database can be customized according the needs identified by a database architect when designing the FLAIM database. Furthermore in more embodiments, the service provider can provide an application programming interface (API) library to the consumer for accessing the service provider's FLAIM database, which will provide access to the data in the language to the consumer, as depicted in step 140. In these embodiments, the API library interface modules will include the same consumer-accessed module name, parameter list, parameter list order, and return the same results for all consumer-used computing environments. In this way, all consumers use a single set of tools/packages, and even if a particular consumer changes computing environments, the consumer is assured that the API to access the database is consistent and no additional development work is required by the service provider or the consumer to acquire access to the data.

As is now apparent to one of ordinary skill in the art, a single message file is associated with all consumer requests for access to data in a language, and a single set of tools/packages is provided to access the data in the language. Thus, multiple message files and multiple tools/packages are not required to support and provide access to the data for cross-computing environments desiring access to the data of the service provider.

Moreover, the loaded message file provides access to more than one consumer requesting access to the same data provided by the service provider. Correspondingly, concurrent access to the data represented by a single message file is achieved with the tenets of the present invention. This improves processing throughput associated with providing access to the data, and reduces support problems associated with providing access to the data.

In another embodiment depicted by FIG. 1, concurrent access to data is permitted to multiple requests (step 110) for the data in cross-languages. The multiple requests can originate from a single consumer desiring access to the data in the first language and a second language, or alternatively the multiple requests can originate from multiple consumers desiring access to the data in the first language and the second language.

With requests, associated with desired accesses to cross-languages, each request is manually or automatically associated with a single and separate message file in step 120. Next, each separate message file is loaded in step 130. The separate message files, in some embodiments, are loaded within memory into as separate message tables. In other embodiments, if all known message identification numbers are unique regardless of all known language formats then the separate message files are loaded and managed within a single message table. In another embodiment, the separate message files are loaded within a data store. Each separate message file can be loaded to the same data store or separate data stores, as desired by any data store architect. In step 140, the loaded message files concurrently services each request.

Figure 2:
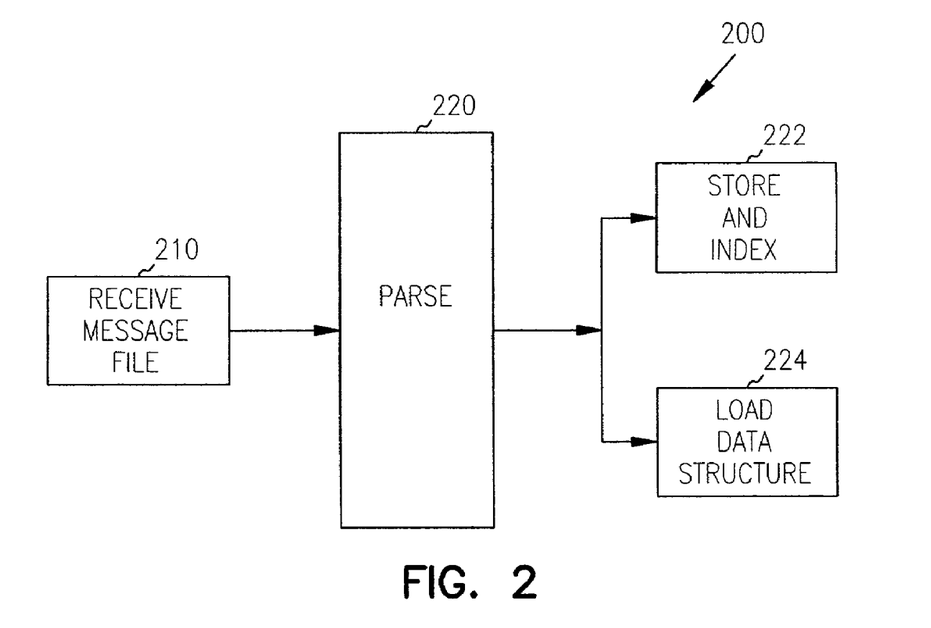
FIG. 2 is a diagram representing processing associated with a message file, according to the teachings of the present invention.

FIG. 2 illustrates one diagram representing processing 200 associated with a message file, according to the teachings of the present invention. In step 210 a message file is received. In some embodiments, the message file is represented in XLIFF. Moreover, the received message file includes identical XLIFF DTDs for each available language supported. The message file is populated with values enclosed by tags defined in the DTDs when a request is received from a consumer. The consumer's computing environment will not impact the DTD associated with the message file. In this way, a single message file is associated with a single desired language for access to data. And, a service provider supports, maintains and otherwise manages a single message file for all requests associated with a single desired language notwithstanding any cross-computing environments being used by the consumer in initiating the request.

In step 210, a parser set of executable instructions, such as the one provided with the Novell XIS package, distributed by Novell, Inc. of Provo, Utah, is used to load the message file. Of course, the message file need not be in an XML compatible data format, since as one of ordinary skill in the art will readily appreciate, any consistent and stable data format can be implemented to represent the message file and used in combination with any parser set of executable instructions developed to load the message file without departing from the teachings of the present invention.

Once the parser processes the message file and the message data to the desired language associated with the request in step 220, the message file is optionally rendered to a data structure in step 224 or a data store where the message file is stored and indexed in step 222. The data structure, in some embodiments, resides in a volatile memory, such as cache or RAM, of non-volatile memory, such as permanent of removable computer readable media. Of course it is readily apparent that a combination of volatile or non-volatile memory can house the message file. In other embodiments, the data structure is represented at various levels of abstraction within a database, such as fields, records, and containers associated with a database. An API library is provided to the consumer to access the database using consistent API module calls, which are not dependent upon any cross-computing environment being used by the consumer.

After the message file is loaded, message data associated with access to the data provided by a service provider, is identified with message identifying numbers. The message identifying numbers permit the retrieval of the appropriate message data in the desired language that is to be provided to the consumer to satisfy the request.

Figure 3:
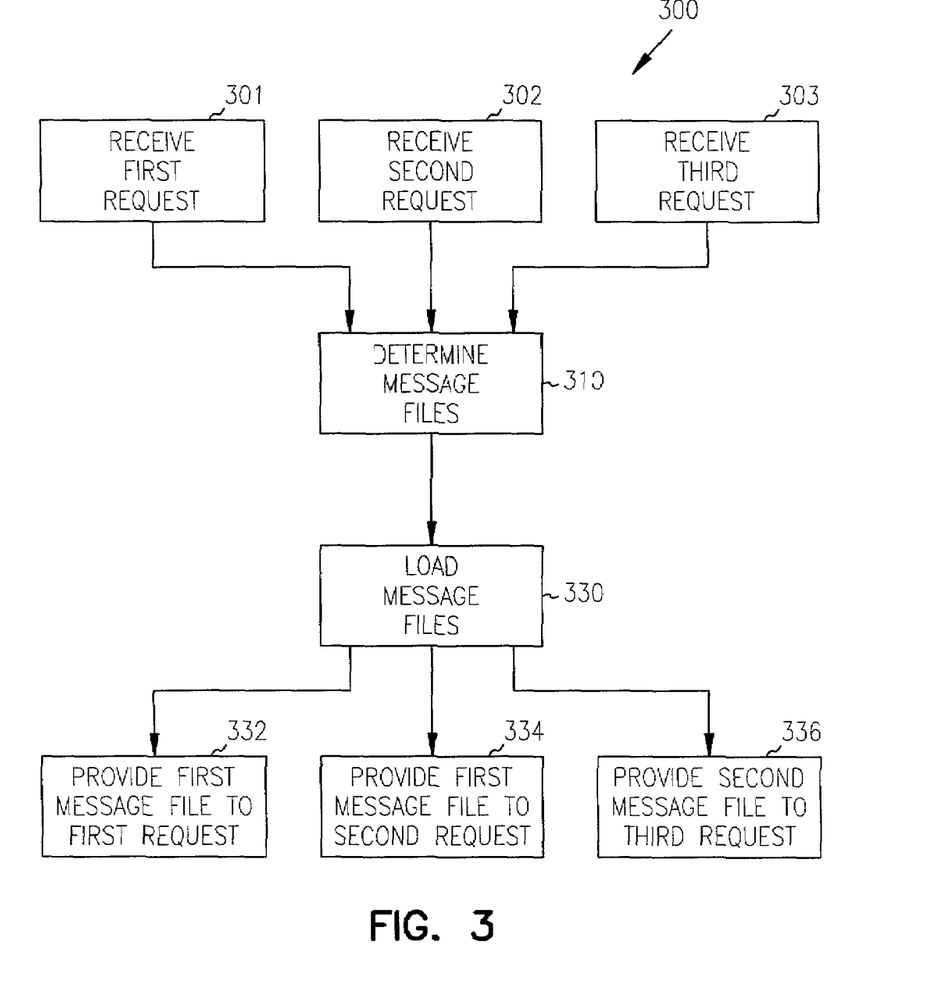
FIG. 3 is a flowchart representing a method of providing concurrent access to data on cross-computing environments, according to the teachings of the present invention.

FIG. 3 illustrates another flowchart representing another method 300 to provide concurrent access to data on cross-computing environments, according to the teachings of the present invention. In step 301, a first request desiring access to the data is received. The first request is received from a consumer having a first computing environment. Concurrently in step 302, a second request desiring access to the data is received. The second request is received from the same or different consumer having a second computing environment, wherein the second computing environment is different from the first computing environment.

As is appreciated by one of ordinary skill in the art, the computing environments can be different based on different operating systems, or different versions of operating systems deployed within each of the computing environments. Moreover, the computing environments can be different based on different file systems or different versions of files systems used by the computing environments, different computing architectures used by the computing environments, different networking interfaces or different versions of network interfaces used by the computing environments, or different applications or different versions of applications that are used to make the requests.

Further, receipt of the requests is made to a service provider. The service provider can be local to the consumer or remote from the consumer. In some embodiments, the service provider implements method 300 as a web service over the Internet from a server computing environment and requests are received from the consumer via web browser used by the consumer. However, as is apparent, the service provider can be a server deployed within a network configuration, which is locally accessed by the consumer. Additionally, method 300 need not be exclusively embodied within a web service using a browser, since any customized interface can be deployed to interface the consumer to the service provider.

In step 310, a single message file is identified and determined in order to service the first request and the second request. The single message file is associated with the data from a host language to a first language desired by the requests. In some embodiments, identification and association of the requests to the single message file is achieved automatically or manually, as discussed above with respect to the discussion of FIG. 1. The requests are used to dynamically populate message data with the appropriate value data enclosed by tags represented in the single message file. In some embodiments, the single message file is represented in XLIFF using XML tags.

Moreover, at least a portion of the value data populated within the single message file represents message data and message identification numbers associated with each message data entry within the message file. Each message data entry corresponds to a portion of the data, which will satisfy the requests. And, each message data entry is an independent message.

The service provider in step 330 then loads the single message file. During the loading process 330, the original message data entries are provided in the desired language to satisfy various portions of the requests. However, the message identification numbers originally populated to the message file remains unchanged. In this way, each message data entry is provided in the desired language during the loading process 330.

In some embodiments the single message file is loaded 330 to a volatile or non-volatile memory by the service provider, within the service provider's computing environment. In other embodiments, the single message file is loaded 330 to a data store during the loading process 330. The data store, in some embodiments, is a database. In still further embodiments, the loading process 330 stores the message file as a data structure within memory or the data store. The data structure can be any developer-defined data structure, such as database structures, hash tables, binary trees, arrays, tables, heaps, treaps, lists, developer-defined structures, and the like.

Moreover, in step 332 the single message file is provided in order to provide the data to the desired language as is directed by the first request from the first computing environment. Concurrently in step 334, the single message file is provided in order to provide the data to the desired language as is directed by the second request from the second computing environment. Therefore, a single message file is processed by the service provider to provide access to the data requested in parallel with two independent requests, wherein each request originates and requires servicing from cross-computing environments.

In yet another embodiment of method 300, a third request is received concurrently with the first request and the second request. The third request is received from a third computing environment and the request desires access to the data in a different language than what is requested by the first and second requests. The third computing environment can be different from both the first and second computing environments, or the third computing environment can be the same as the first computing environment or the second computing environment.

Since the third request desires a different language to access the data than what was required by the first and second requests, a second message file is determined and identified to service the third request in step 310. In step 330, the second message file is concurrently loaded to memory or a data store with the first message file. And, in step 336 concurrent access to the second message file in order to provide the data, as required by the third request, is provided for consumption by the third computing environment. In this way, cross-languages are concurrently provided to access the data in addition to concurrently providing access to the data in cross-computing environments.

Figure 4:
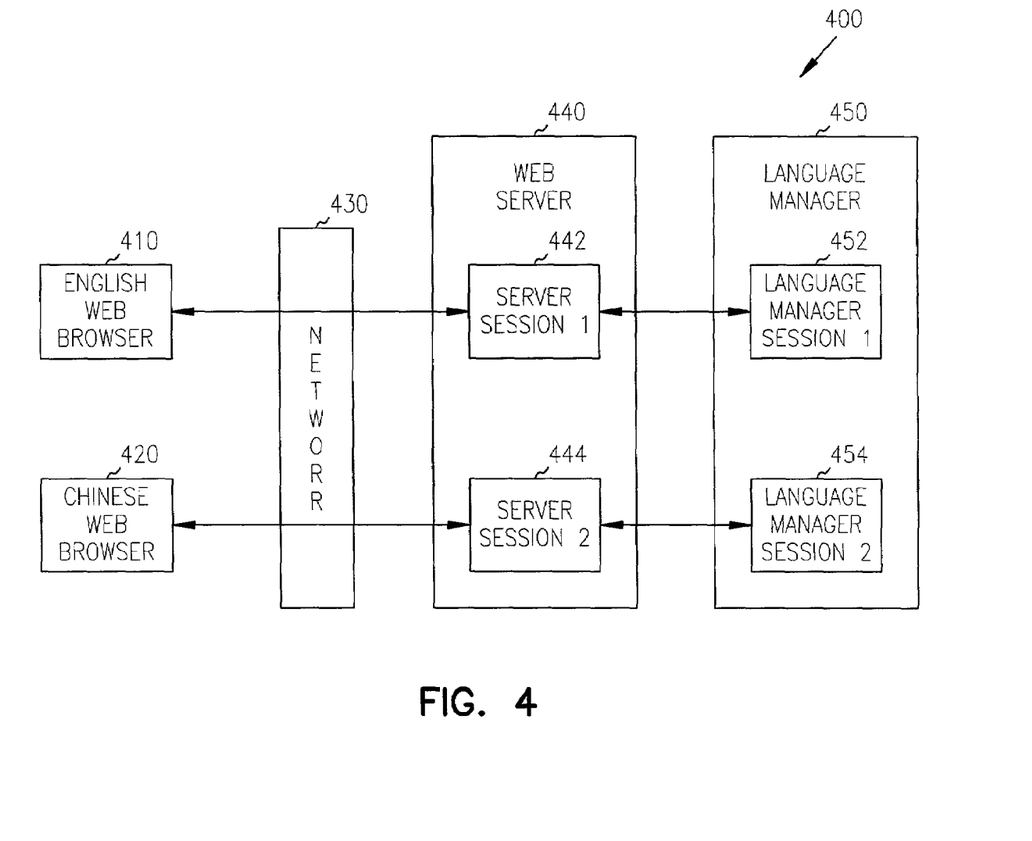
FIG. 4 is a diagram showing another aspect of providing concurrent access to data in cross-computing environments, according to the teachings of the present invention.

FIG. 4 illustrates a diagram of another aspect of providing concurrent access to data in cross-computing environments, according to the teachings of the present invention. In the example provided in FIG. 4, architecture 400 includes a number of consumers represented as browser applications (e.g., English browser 410 and Chinese browser 420). The browsers 410 and 420 access a web server 440 via a network interface 430, such as and by way of example only an Internet network interface 420. Each browser 410 and 420 establishes a server session 442 and 444, respectively, with the web server 440 via the network 430.

Next, the web server 440 identifies a request to access data in an English format from the English browser consumer 410 and establishes web server 440 session 1 442. This forces the server session 1 442 to initiate a call to a Language Manager (LM) set of executable instructions 450 establishing a first LM 450 session 1 452 occurring between the web server 440 session 1 442 and the LM 450 session 1 452. The LM 450 session 1 452 then loads a single occurrence of a message file necessary to provide messages associated with the web server 440 session 1 442 to the English web browser consumer 410 in an English language. A variety of additional web server 440 sessions can be established for different English requesting consumer browsers to access the data, but a single LM 450 uses a single message file to service all such sessions regardless of the computing environments from where the English requesting consumer browsers originate.

Moreover, while the LM 450 is servicing the English consumer web browser 410, a second Chinese consumer web browser 420 can establish a second server session 2 444 with the web server 440 via the network 430. This establishes a second session 2 454 for the LM 450 where a second message file is loaded concurrently with the first English message file to service the Chinese consumer web browser 420. In this way, the LM 450 concurrently provides and facilitates access to the data in cross languages and in cross computing environments. Of course as one of ordinary skill in the art will readily appreciate, a variety of additional architectures and examples can be provided without departing from the broad scope of the present invention, and all such variations are intended to fall within the scope of the present invention.

Figure 5:
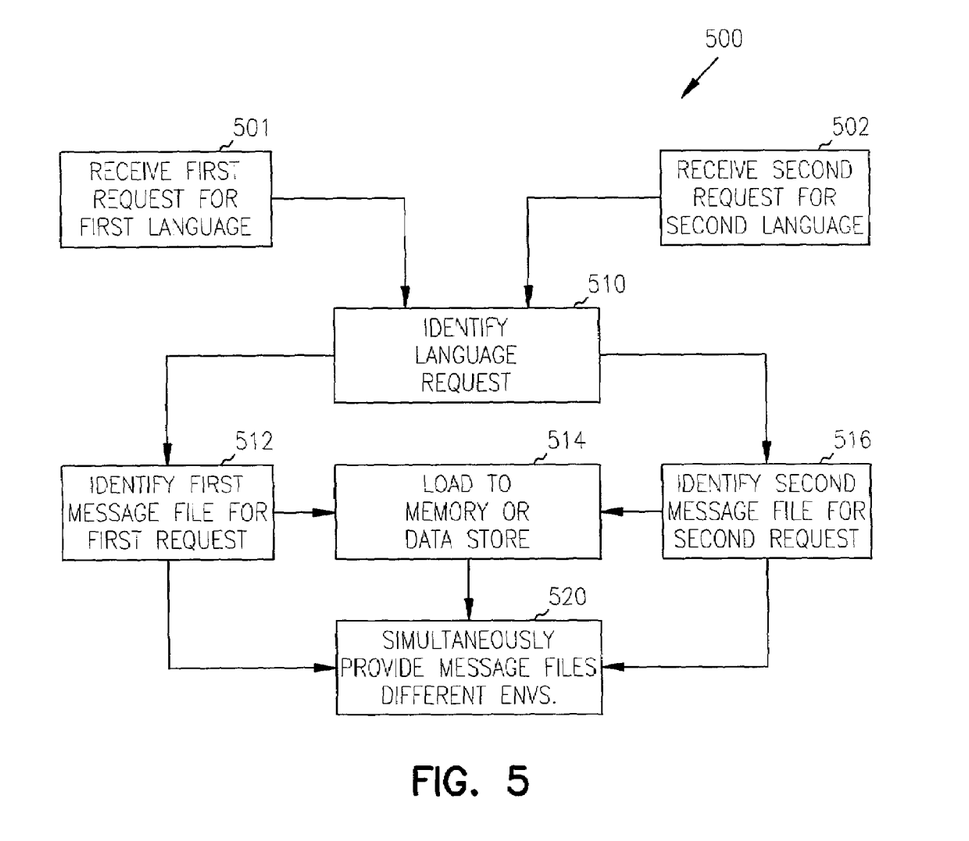
FIG. 5 is a flowchart representing a method of providing access to data in cross-languages and on cross-computing environments, according to the teachings of the present invention.

FIG. 5 illustrates a flowchart representing a method for providing access to data in cross-languages and on cross-computing environments, according to the teachings of the present invention. Initially, a first request for the data is received in step 501, the first request desires access to the data in a first language. Concurrently in step 502, a second request for the data is received, and the second request desires access to the data in a second language. Furthermore, the first request originates from a first computing environment and the second request originates from a second computing environment. In some embodiments, the first computing environment is also different from the second computing environment.

In step 510, each request is identified as being associated with the appropriate desired language for the data. Accordingly, in step 512 a first message file used to process the data in the first language is identified. Moreover, in step 516 a second message file used to process the data in the second language is identified. In some embodiments the data format of the message files is in an XML compatible format, such as XLIFF. Identification and association of the message files can be automatically provided or manually provided with the first and second requests, as was discussed above in the discussion provided for FIG. 1.

Next, the first message file and the second message file are parsed and/or processed to a memory or a data store in step 514. In some embodiments, if the message files are parsed and/or processed to a memory (e.g., volatile memory or non-volatile memory) then the parsed or processed message files are represented within the memory as a data structure, such as a table, wherein originally provided message identifications associated with originally provided message data that were dynamically populated in the message files are now associated with the same message identifications used to index and retrieve message data, however, the data structure now includes message data representing the first language and the second language required to satisfy the first and second requests.

In other embodiments the first and second message files are parsed and/or processed to a data store, such as a FLAIM, and represented as database structures within the database. In this embodiment, various levels of granularity associated with the database structure are achieved by embodying the message data and the originally provided message identification numbers in containers, records, and fields. Of course as one of ordinary skill in the art will appreciate, any number of developer-defined abstractions, defined by the data structure, can be achieved, and all are intended to fall within the broad scope of the present invention.

In step 520, the first and second message files are concurrently or simultaneously provided in order to service the first and second requests in the first and second computing environments, respectively. Furthermore, in some embodiments the first computing environment is different from the second computing environment. Moreover the first and second message files provide access to the data in the first and second language, respectively. Thus, access to the data is provided in cross-languages to cross-computing environments.

Figure 6:
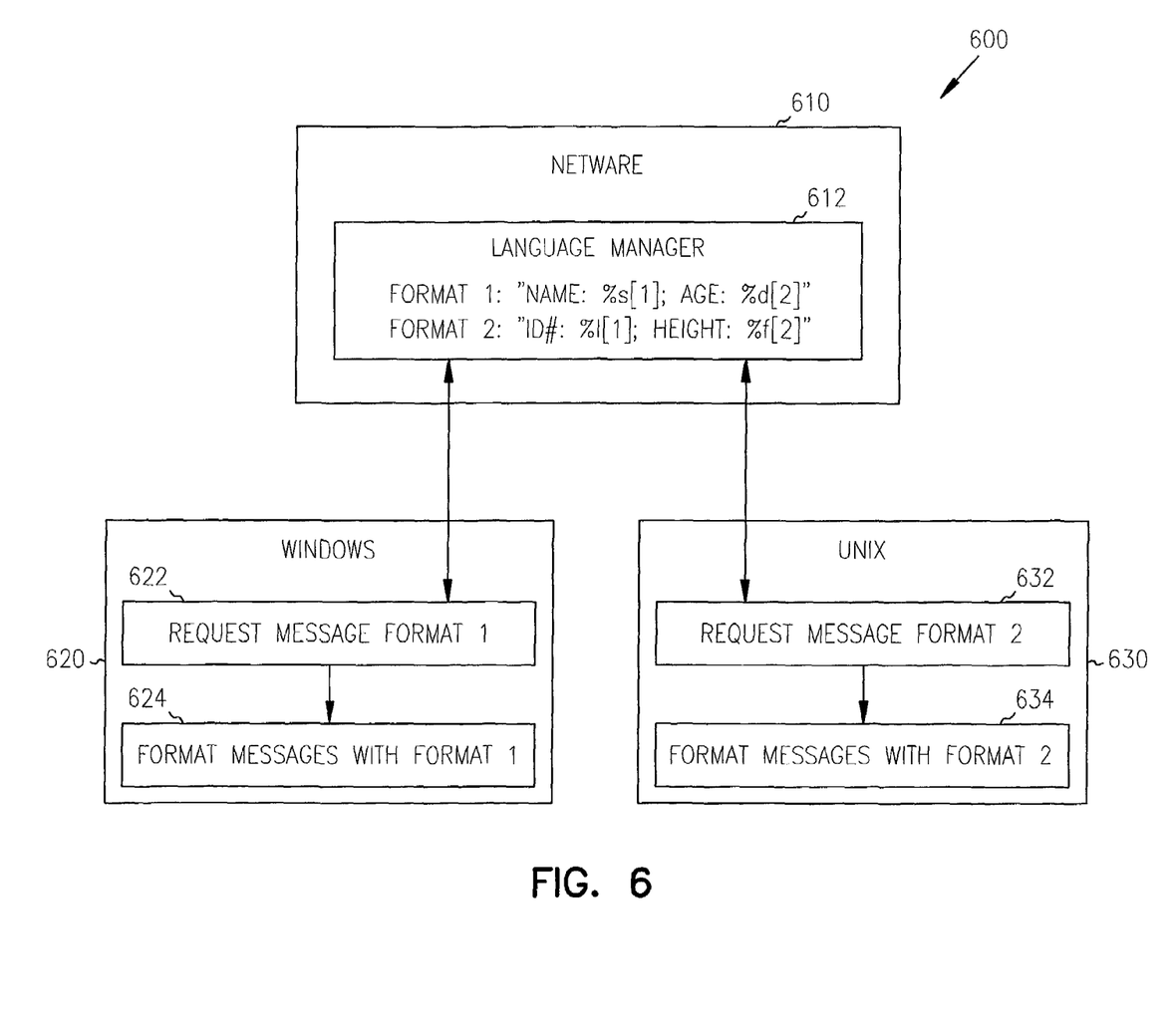
FIG. 6 is a diagram of sharing data on cross-computing environments, according to the teachings of the present invention.

FIG. 6 illustrates a diagram of one example for sharing data in cross-computing environments, according to the teachings of the present invention. In an architecture 600 of FIG. 6, a Language Manager (LM) 612 set of executable instructions reside in a first platform 610 identified as executing the Novell NetWare operating system (OS). The LM 612 provides a single API to all variant platforms, so that a Windows platform 620 and a Unix platform 630 both interact and interface to the LM 612 from the Netware OS platform 610 using the same API calls.

Moreover, the Windows platform 620 can request from the LM 612 data in a first language requiring messages associated with the data to be delivered using a message file having a first format 1 622. The interaction with the LM 612 provides the messages with the first format 1 624 in the first language within the Windows platform 620. Concurrently, the Unix platform 630 can request from the LM 612 the data in a second language requiring messages associated with the data to be delivered using a message file having a second format 2 632. The concurrent interaction with the LM 612 provides the messages in the second format 2 634 within the Unix platform 630.

Therefore as is apparent to one of ordinary skill in the art, the LM 612 and its API provide concurrent access to the data in cross-computing environments (e.g., Windows platform 620 and Unix platform 630) where the data is provided in cross languages using a message file format for each desired language (e.g., format 1 624 and format 2 632).

Figure 7:
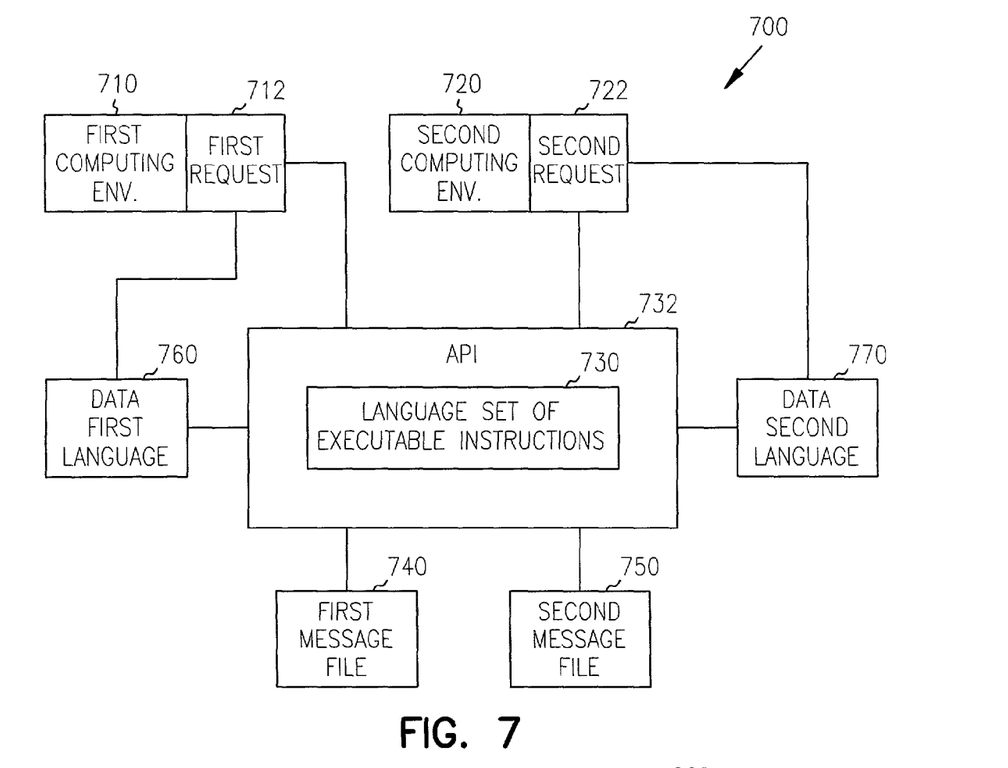
FIG. 7 is a diagram of a system to provide access to data in cross-languages and on cross computing environments, according to the teachings of the present invention.

FIG. 7 illustrates a diagram of a system 700 that provides access to data in cross-languages for cross computing environments, according to the teachings of the present invention. The system 700 includes a first request 712 for the data originating from a first computing environment 710 and a second request 722 for the data originating from a second computing environment 720. Further, the system 700 includes a first message file 740, a second message file 750, and a set of language manager executable instructions (LM) 730.

The LM 730 is operable to identify the first message file 740 and load it into a first data structure, which is used to provide the message data embedded in the first message file 740 as message data in a first language 760. Moreover, the LM 730 is operable to identify the second message file 750 and load it into a second data structure, which is used to provide the message data embedded in the second message file 750 as message data in a second language 770. The message data represents at least a portion of the data to which the requests 712 and 722 desire access.

The LM 730, in some embodiments, is provided as a set of tools and packages, and made available with an API library 732. The API library 732 provides an interface between the LM 730 and the first request 712 and the second request 722. A number of modules within the API library 732 can be provided such as, and by way of example only, a load module and a retrieve module. The load module loads the first message file 740 and the second message file 750. In some embodiments, the load module loads message files as the first and second data structures representing the message files in memory in the first 760 and second 770 languages. In other embodiments, the load module loads the message files as first and second data structures representing the message files into a data store in the first 760 and second 770 languages. Also, the retrieve modules permit the first request 712 and the second request 722 to access specific message data embodied in the first and second data structures in a first language 760 and a second language 770, respectively.

Of course, a variety of other customized and useful modules can be provided in various other API library 732 embodiments, such as message locking capabilities to prevent write operations from occurring to a message data entry embodied in the first and second data structures while concurrent access is occurring in the locked message data entry. Additionally, the API library 732 provides consistent calling access to each of the provided modules. Accordingly, any consumer computing-environment can reliably be assured that the modules calls made to the API library 732 are consistent and persistent across cross-computing environments.

In one embodiment, at least one of the requests 712 or 722 is received over the Internet by the LM 730 through a browser set of executable instructions used in either the first computing environment 710 or the second computing environment 720. In yet another embodiment, the first computing environment 710 is different from the second computing environment 720. And, the computing environment of the LM 730 can be the same as the first computing environment 710 or the second computing environment 720. Alternatively, the computing environment of the LM 730 is different from both the first computing environment 710 and the second computing environment 720. Additionally, the first language 760 is different from the second language 770. And in other embodiments, the first message file 740 and the second message file 750 are represented in an XML format, such as XLIFF.

Figure 8:
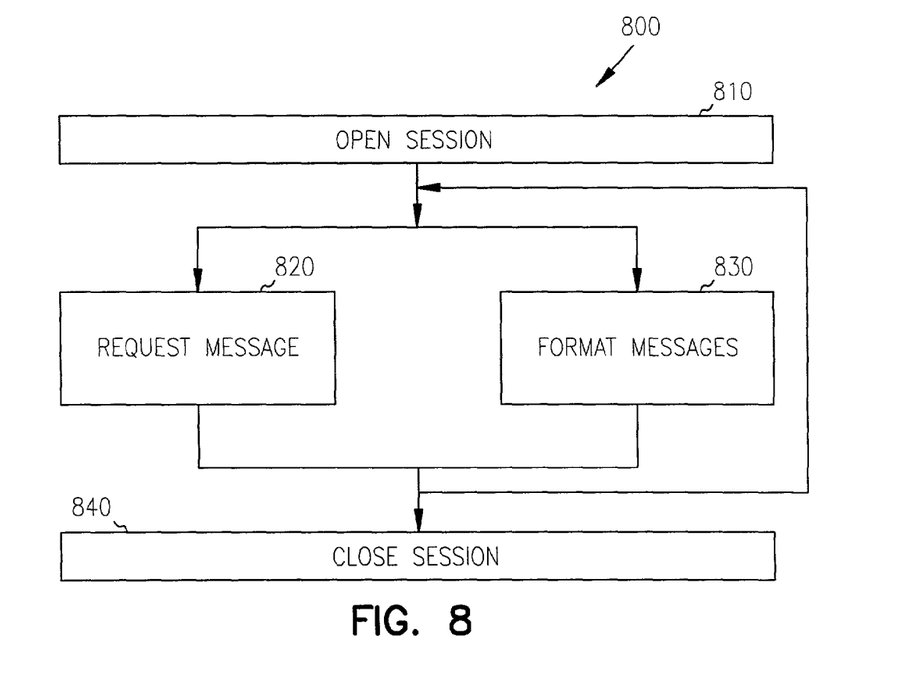
FIG. 8 is a diagram of a typical language manager session, according to the teachings of the present invention.

FIG. 8 illustrates a diagram of one typical Language Manager Session (LM) 800, according to the teachings of the present invention. The LM 800 is a set of executable instructions operable to load message files and retrieve messages associated with the message files. The LM 800 can load to memory or to a data store the message files. Initially, the LM 800 establishes a session with a consumer either directly or indirectly through an intermediate service acting on behalf of the consumer, such as a web server and the like. The session is then opened in block 810. Once the session is opened in block 810, individual messages associated with the message file can be requested in block 820 and formatted in block 830.

The LM 800 maintains a session and services the consumer and the consumer's request for accessing the data in a desired language by retrieving messages and formatting messages in blocks 820 and 830, until the consumer terminates the session in block 840. The LM 800 is operable to have multiple concurrent sessions open and service multiple consumers residing in cross-computing environments and desiring access to the data in cross-languages.

Figure 9:
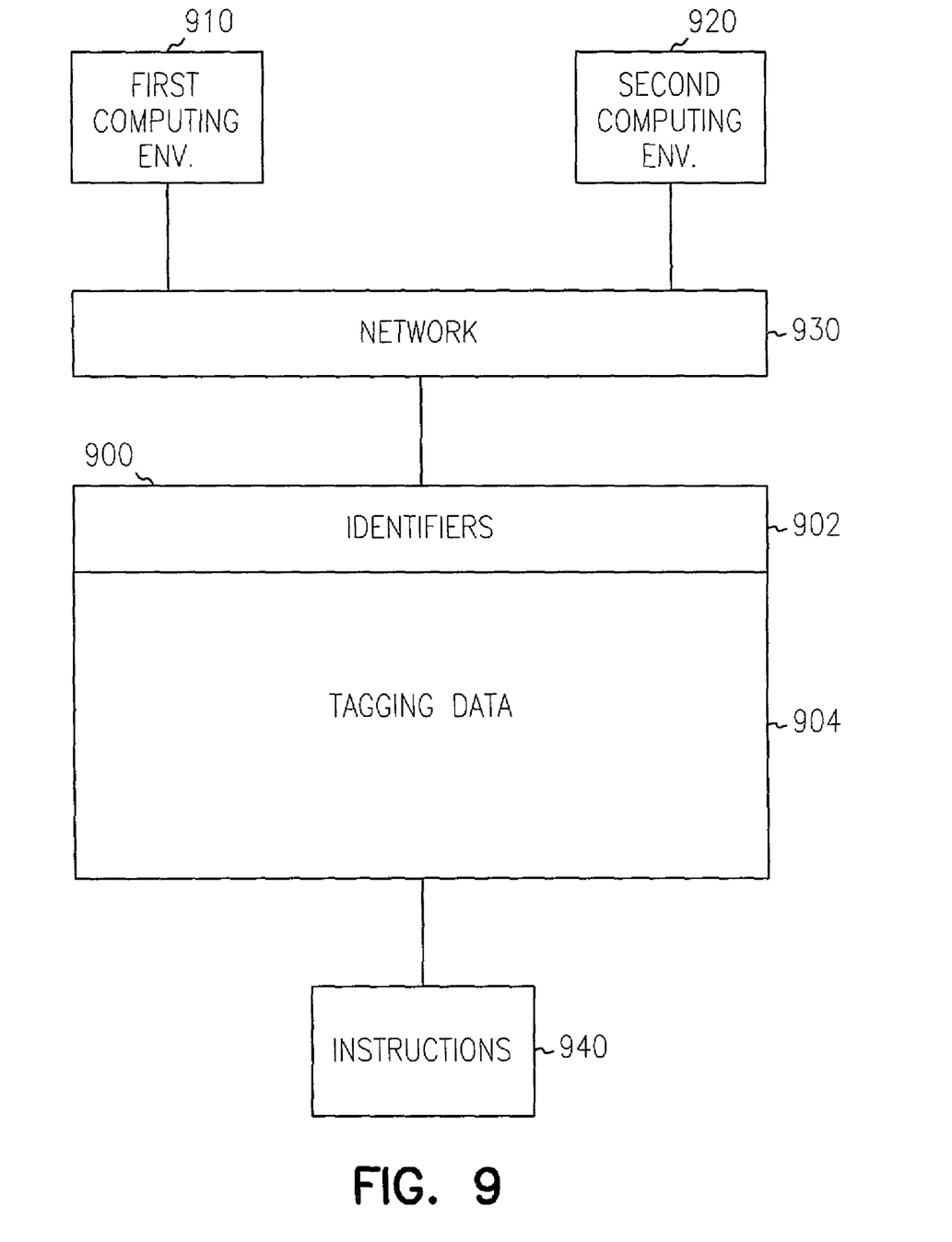
FIG. 9 is a diagram of a cross-computing environment message file, according to the teachings of the present invention.

FIG. 9 illustrates a diagram of one cross-computing environment message file 900, according to the teachings of the present invention. The message file 900 includes one or more message identifiers 902 and tagging data 904. The message file 900 is accessible from any computer readable medium and need not be contiguously stored in volatile or non-volatile storage or memory. The message file 900 is partially predefined such that the tagging data is consistent for each desired language, and in some embodiments this consistency is achieved by using an XML compatible data tagging format defined in an XLIFF DTD for each instance of the message file 900 defined for a specific language.

The tagging data 904 is operable to be used by instructions 940 to process the message file 900 to a first language of a first computing environment 910 and a second language of a second computing environment 920. The first computing environment 910 is different from the second computing environment 920, and the first language, in some embodiments, is different from the second language.

The instructions 940 can be embodied as an API library as a parsing set of executable instructions or as a loading and a retrieving set of executable instructions, or as a combination of all the before mentioned embodiments. Furthermore, and in various embodiments, the instructions 940 generate a table having data from the message file 900, wherein the data is operable to be loaded and retrieved, and the data provides message data associated with the message file 900 in a requested language for the first computing environment 910 and the second computing environment 920. Also, the instructions 940, in some embodiments, can load the data to a memory or a data store, or combinations thereof.

In one embodiment, the message file 900 interfaces with a first request originating from the first computing environment 910 and a second request originating from the second computing environment 920. Further, first request and the second request desire access to data in the same language, but the first computing environment 910 is different from the second computing environment 920.

In yet another embodiment, different instances of the message file 900 are used to concurrently and simultaneously interface a first request originating from the first computing environment 910 and a second request origination from the second computing environment 920. In this embodiment, the first request desires access to data in a first language and the second request desires access to the data in a second language. Moreover, the first language is different from the second language, however, the first computing environment 910 can be the same as, or different from, the second computing environment 920.

In yet more embodiments, the message file 900 is made available or otherwise passed over a network 930 so that it is accessible to the first computing environment 910 and the second computing environment 920. As previously discussed, the network 930 can be any network interface, direct, indirect, wireless, hardwired, or combinations thereof.

Figure 10:
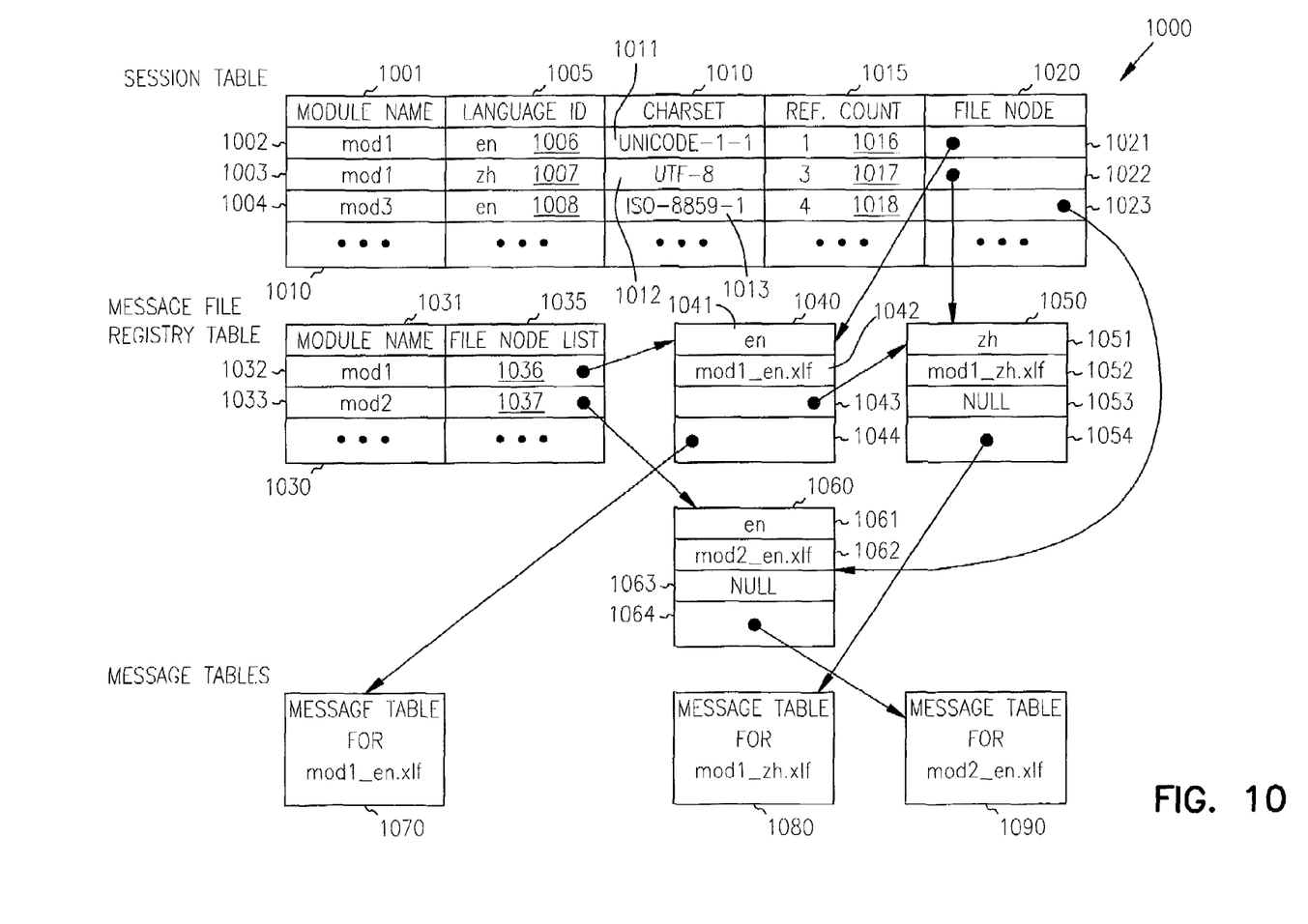
FIG. 10 is a diagram of an embodiment of data structures, according to the teachings of the present invention.

FIG. 10 illustrates a diagram of data structures 1000, according to the teachings of the present invention. In the example provided in FIG. 10, a variety of data structures (e.g., 1010, 1030, 1040, 1050, 1060, 1070, 1080, and 1090) are maintained in memory by a language manager (LM) set of executable instructions to service requests from consumers. The LM uses the data structures (e.g., 1010, 1030, 1040, 1050, 1060, 1070, 1080, and 1090) to service requests from consumers to access data in a variety of languages notwithstanding the computing environments of the consumers.

A first data structure is represented as a session table 1010 identifying the sessions occurring with a consumer. The columns of the table 1010 can be represented as Module Name 1001, Language ID 1005, Charset 1010, Ref. Count 1015, and File Node 1020. The rows of the table 1010 identify a specific session being managed by the LM. The Module Name 1001 identifies the consumer application accessing the LM for service. For example, consumer "mod1" includes two sessions 1002 and 1003, whereas consumer "mod2" includes a single session with the LM identified by 1004. The Language ID 1005 identifies the language desired by the session being managed for the consumer. For example, "en" 1006 and 1008 represent an English language session, while "zh" 1007 represents a Chinese language session.

Charset 1010 represents the character set to use when providing messages to the consumer during the LM session. For example, the first session for consumer "mod1" 1002 uses the English language "en" 1006 with a UNICODE-1-1 1011 character set for messages. But, a second session for the consumer "mod1" 1003 uses the Chinese language "zh" 1007 with a UTF-8 character set for messages. Still further, a second consumer "mod2" 1004 uses the English language with an ISO-8859-1 character set for messages. In this way, languages can be presented using different character sets 1010 to provide access to the data in cross-computing environments.

The Ref. Count column 1015 in the LM session table 1010, represents the number of concurrent sessions accessing the message file identified by the Module Name 1001, the Language ID 1005 and the Charset 1010 combined. For example, the LM in FIG. 10 is presently concurrently servicing 1 1016 session using a single message file having the English language 1006 using the UNICODE-1-1 1011 character set, 3 1017 sessions using a single message file having the Chinese language 1007 using the UTF-8 1012 character set, and 4 1018 sessions using a single message file having the English language 1008 using the ISO-8859-1 1013 character set.

The File Node column 1020 in the LM session table 1010, provides a pointer (e.g., 1021, 1022, and 1023) to a specific message file data structure (e.g., 1040, 1050, and 1060) containing pointers to the loaded message tables (e.g., 1070, 1080, and 1090). Moreover, a second managing table data structure 1030 provides direct access for the LM to the appropriate message file data structure (e.g., 1040, 1050, and 1060) for each individual consumer "mod1" 1032 and "mod2" 1033. The managing table 1030 includes two columns, a Module Name column 1031 and a File Node List 1035. The File Node List column 1035, allows the LM to traverse and manage a linked list of all message files in different languages for the same module. The list is for the message file data structures (e.g., 1040, 1050, and 1060) and access to the loaded message tables (e.g., 1070, 1080, and 1090) can be obtained by traversing the list.

For example, the managing data structure 1030 can be directly accessed at anytime to service a specific message associated with a session, on the consumer's Module Name column 1031, such as "mod1" 1032, then the corresponding File Node List pointer 1036 points to the head 1040 of the message file data structure list consisting of 1040 and 1050. The message file data structure 1040 includes a language identifier "en" 1041 representing the English language, the name of the message file "mod1_en.xlf" 1042 being used to service the English language, a pointer 1043 to the next node in the linked list, and a pointer 1044 to the loaded message table 1070 used to service the English language with the UNICODE-1-1 1011 character set. In a similar way, consumer identified as "mod1" 1032 includes a "zh" 1051 Chinese language node 1050 in the linked list 1040 and 1050 associated with consumer "mod1." The node 1050 also identifies the message file "mod1_zh.xlf" used to service the Chinese language request with the UTF-8 1012 character set and a Null 1053 next pointer, since node 1050 is the tail of the linked list 1040 and 1050 for consumer "mod1." Finally, a pointer 1054 to the loaded Chinese message table 1080 in node 1050 provides the LM direct access to the servicing message table 1080.

Similarly, the managing data structure 1030 includes a unique entry 1033 for the second consumer "mod2" identifying a single node list 1060, for the English language "en" 1061, with a message file name of "mod2_en.xlf" 1062, a NULL next list node pointer 1063, and a pointer 1064 to the loaded message table 1090 used to service the English language in the ISO-8859-1 1013 character set.

One of ordinary skill in the art readily recognizes that the data structures (e.g., 1010, 1030, 1040, 1050, 1060, 1070, 1080, and 1090) allow the LM of the present invention to efficiently manage and access the appropriate messages associated with the data in cross-languages for cross-computing environments. Access to the data is concurrent provided by a single LM using single and multiple message files as needed, thereby substantially improving software maintenance, performance, and support associated with the message files and providing the data in cross-languages to cross-computing environments.

As is now apparent from the above provided descriptions, a single message file is used to provide access to data in a first language to cross-computing environments. Furthermore, access to the single message file can be concurrently provided to the cross-computing environments. Additionally, a first computing environment and a second computing environment can simultaneously request two message files to provide access to the data in cross-languages. One of ordinary skill in the art will readily appreciate, that the above described embodiments provide significant improvements over what presently exists in the art, since access, development, maintenance, support, and processing throughput is improved for internationalization-localization techniques related to the delivery of software products and data content.

The foregoing description of various embodiments of the invention has been presented for purposes of illustration and description. It is not intended to be exhaustive nor to limit the invention to the precise form disclosed. Many alternatives, modifications, and variations will be apparent to those skilled in the art in light of the above teaching. For example, although various embodiments of the invention have been described as a series of sequential steps, the invention is not limited to performing any particular steps in any particular order. Accordingly, this invention is intended to embrace all alternatives, modifications, equivalents, and variations that fall within the spirit and broad scope of the attached claims.

Moreover, although for purposes of illustration the present invention was discussed by using internationalization techniques, it is readily appreciated by one of ordinary skill in the art that the present invention is not so limited. For example, the present invention can permit personalization of content within web browsers or any software product, such that customized text messages, images (e.g., pictures, graphics, icons, and the like), audio snippets, or video clips are presented to a specific consumer or class of consumers by using the message file of the present invention. Accordingly, all such variations are intended to fall within the broad scope of the present invention.

What is claimed is:

1. A method of providing concurrent access to data on cross-computing environments, comprising:

receiving a first request for the data from a first computing environment;

receiving a second request for the data from a second computing environment, wherein the second computing environment is different from the first computing environment;

identifying a first message file to service the requests; and
concurrently providing access to the first message file to both the first computing environment and the second computing environment in order to load the data as directed by the first request from the first computing environment and the second request from the second computing environment, wherein the first message file is for dynamically rendering and translating the data into a desired language associated with the first and second requests and wherein at least a portion of the message file is dynamically resolved in response to the first computing environment, and wherein the portion is different from another portion that is dynamically resolved from the message file in response to the second computing environment, and wherein the desired language is related to a language used in a particular country having a particular dialect, and wherein the first message file is just associated with the desired language and the first message file is also associated with the first and second computing environments that are cross-computing environments.

2. The method of claim 1, further comprising loading the first message file into a memory before providing the message file to the requests.

3. The method of claim 1, further comprising loading the first message file into a data store before providing the message file to the requests.

4. The method of claim 1, wherein in identifying the first message file, the first message file is identified with a first language associated with the requests.

5. The method of claim 1, wherein in providing the first message file, the first message file is represented in a generic file format.

6. The method of claim 1, further comprising:
loading the first message file into a memory;
receiving a third request from a third computing environment for the data, wherein the third request requires a second message file associated with a different language than required by the first request and the second request;
identifying the second message file;
loading the second message file into the memory concurrently with the loaded first message file; and
concurrently providing access to the second message file in order to load the data as required by the third request from the third computing environment while access is provided to the first message file to satisfy the first request and the second request.

7. The method of claim 6, wherein in receiving the third request, the third computing environment is the same as the first computing environment or the second computing environment.

8. The method of claim 6, wherein in receiving the third request, the third computing environment is the different from the first computing environment and the second computing environment.

9. A method of providing access to data in cross-languages and on cross-computing environments, comprising:
receiving a first request for the data, wherein the first request requires the data to be provided in a first language on a first computing environment;
receiving a second request for the data, wherein the second request requires the data to be provided in a second language on a second computing environment;
identifying a first message file of the data for the first language;
identifying a second message file of the data for the second language; and
concurrently providing the first message file and the second message file to service the first request and the second request in the first computing environment and the second computing environment, and wherein the first and second message files are for dynamically rendering and translating the data into different languages and wherein at least a portion of the first and second message files are dynamically resolved in response to the first computing environment and the second computing environment, respectively, and wherein the different languages relate to different languages associated with different countries or different dialects within a same country, and wherein the first language and the second language are each in one of the different languages or are in cross-languages, and the first message file is just associated with the first language and the second message file is just associated with the second language, and wherein the first message file and the second message files are each associated with the first and second computing environments.

10. A system to provide access to data in cross-language formats and on cross computing environments, comprising:
a first request for the data from a first computing environment;
a second request for the data from a second computing environment;
a first message file;
a second message file; and
a set of language manager executable instructions operable to identify the first message file and load it into a first data structure representing the data in just a first language, the set of language manager executable instructions also is further operable to identify the second message file and load it into a second data structure representing the data in just a second language, and wherein the first and second message files are for dynamically rendering and concurrently translating the data into the first language and the second language, and wherein at least a portion of the first message file and the second message file is dynamically resolved in response to the first computing environment and the second computing environment, respectively, and wherein the first and second languages are associated with languages of different countries or different dialects for a same country, and wherein the first and second message files are each associated with the first and second computing environments.

11. The system of claim 10, wherein the first computing environment is different from the second computing environment and the first language is different from the second language.

12. The system of claim 10, wherein the set of language manager executable instructions loads the first message file and the second message file into a memory.

13. The system of claim 10, wherein the set of language manager executable instructions loads the first message file and the second message file into a data store.

14. The system of claim 10, wherein at least one of the requests is received over the Internet using a set of browser executable instructions.

15. The system of claim 10, wherein the set of language manager executable instructions retrieves the data from the first data structure and the second data structure to satisfy the first request and the second request.

16. The system of claim 10, further comprising a single application programming interface library providing an interface between the set of language manager executable instructions and the requests from the computing environments.

17. The system of claim 10, wherein the requests and the message files are represented in an extensible markup language format.

* * * * *